United States Patent [19]

Wyckoff

[11] Patent Number: 4,606,794
[45] Date of Patent: Aug. 19, 1986

[54] AUTOMATED SOLAR STILL

[76] Inventor: Robert L. Wyckoff, 136 Oran Ct., Napa, Calif. 94558

[21] Appl. No.: 692,121

[22] Filed: Jan. 17, 1985

Related U.S. Application Data

[60] Continuation-in-part of Ser. No. 528,399, Sep. 1, 1983, abandoned, which is a division of Ser. No. 287,416, Jul. 27, 1981, abandoned.

[51] Int. Cl.$^4$ .............................................. C02F 1/14
[52] U.S. Cl. ..................................... 202/173; 202/176; 202/181; 202/234; 137/251.1; 159/903; 203/1; 203/2; 203/10; 203/DIG. 1
[58] Field of Search ............... 202/234, 173, 181, 160, 202/185.3, 202, 176; 203/10, 11, 1, 2, DIG. 1, DIG. 25, 100; 165/179; 137/251; 126/446; 55/355; 159/903

[56] References Cited

U.S. PATENT DOCUMENTS

| | | |
|---|---|---|
| 102,633 | 5/1870 | Wheeler et al. ................... 202/234 |
| 2,490,659 | 12/1949 | Snyder ................................ 159/903 |
| 2,843,536 | 7/1958 | Mount ................................ 202/234 |
| 3,088,882 | 5/1963 | Justice ................................ 202/234 |
| 3,167,488 | 1/1965 | Malek ................................ 202/234 |
| 3,314,862 | 4/1967 | Hay ................................... 202/234 |
| 3,330,740 | 7/1967 | Duffy ................................. 202/180 |
| 3,528,449 | 9/1970 | Witte et al. ....................... 137/251 |
| 3,696,003 | 10/1972 | Fitch et al. ..................... 202/185.6 |
| 3,775,257 | 11/1973 | Lovrich ........................... 202/202 |
| 3,838,016 | 9/1974 | Powers ............................ 202/202 |
| 4,075,063 | 2/1978 | Tsay et al. .................... 203/DIG. 1 |
| 4,089,750 | 5/1978 | Kirschman et al. ............. 202/190 |
| 4,270,981 | 6/1981 | Stark ............................... 202/234 |
| 4,371,623 | 2/1983 | Taylor ............................. 203/19 |
| 4,377,441 | 5/1983 | Kimmell et al. ................ 202/234 |

Primary Examiner—Wilbur Bascomb
Attorney, Agent, or Firm—Norman E. Reitz

[57] ABSTRACT

An automated solar still is disclosed which incorporates a system of valves and other controls that halts production when the level of solar insolation is not adequate to support evaporation, admits water for treatment only when the still requires resupply, operates at nominal pressure by gravity flow and flushes out suspended and dissolved contaminants automatically. Production is halted under conditions of inadequate solar insulation by means of a temperature sensitive valve which is exposed to the received sunlight. In one embodiment, heating and evaporation occur directly in a central chamber. In another embodiment heating occurs in external panels and evaporation occurs from trays in an evaporation chamber. With changes in dimensions and proportions the system of controls may be used in solar stills for desalinating sewater.

5 Claims, 15 Drawing Figures

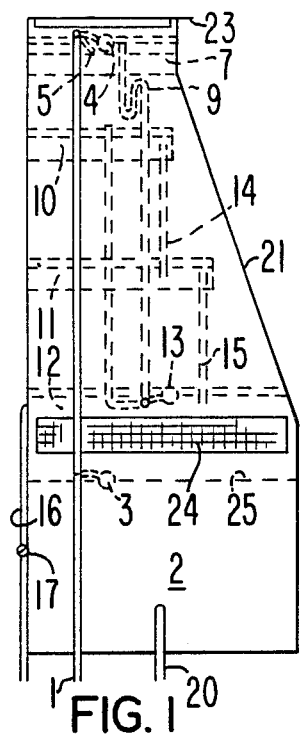
FIG. 1
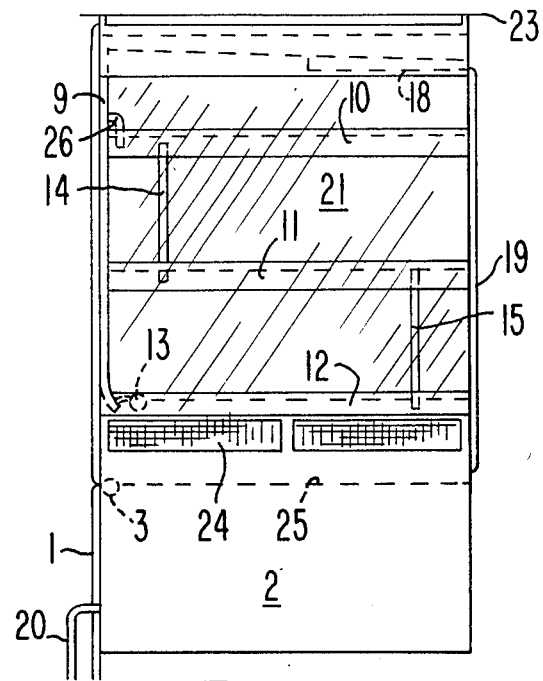
FIG. 2
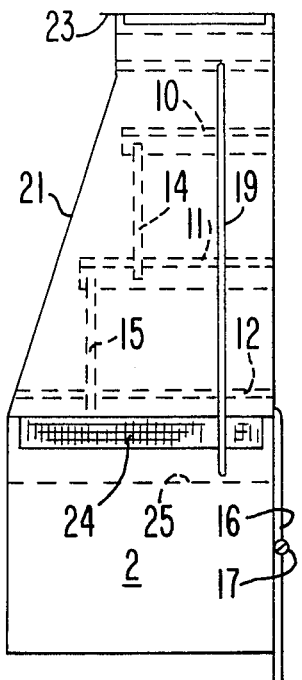
FIG. 3
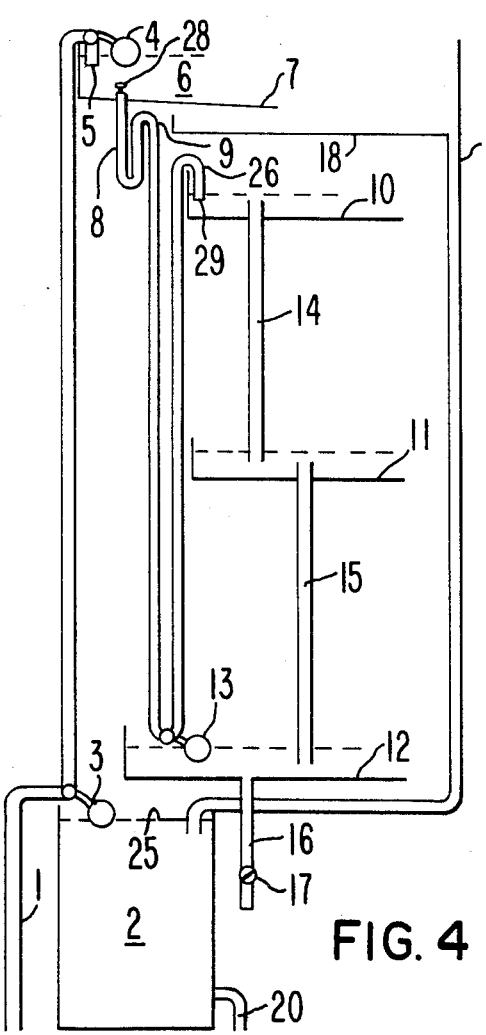
FIG. 4
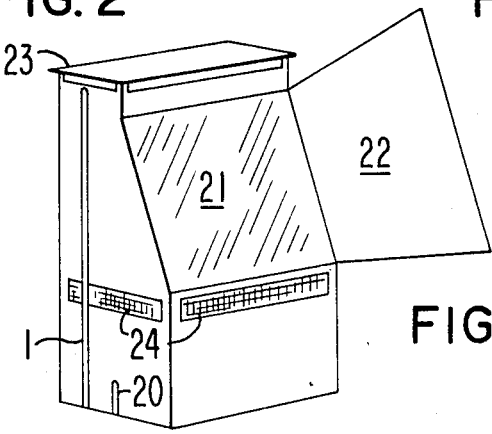
FIG. 5
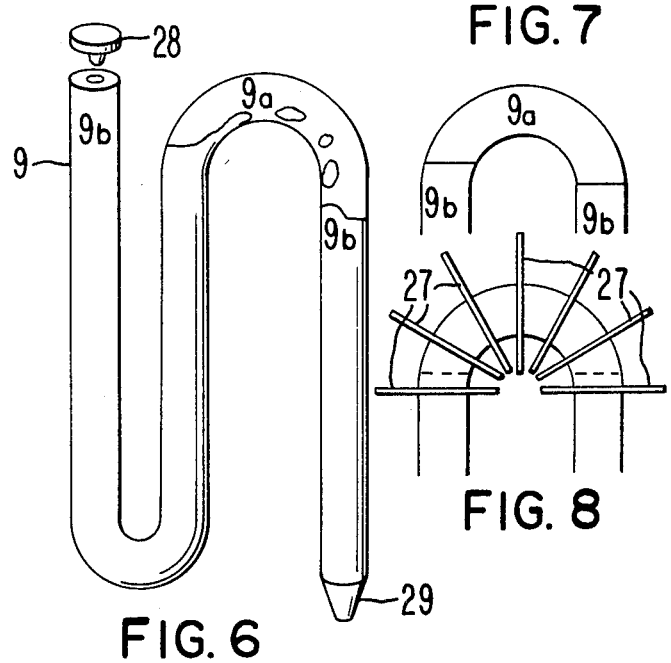
FIG. 6
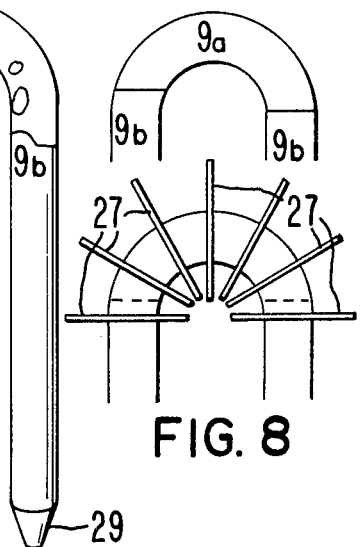
FIG. 8
FIG. 7

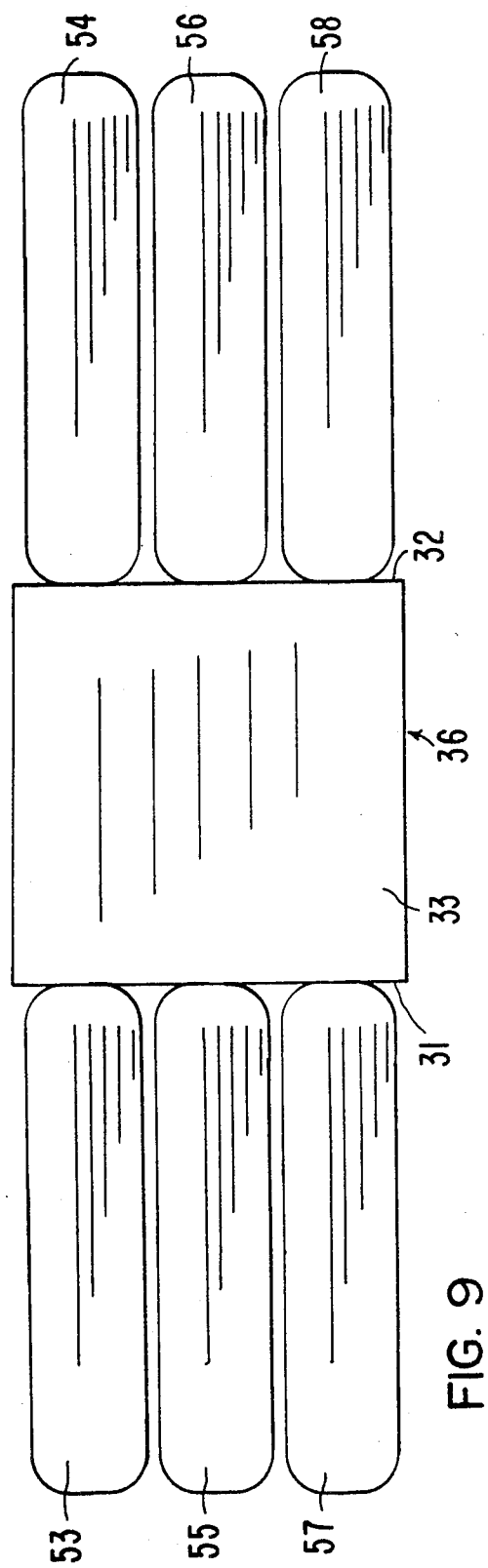
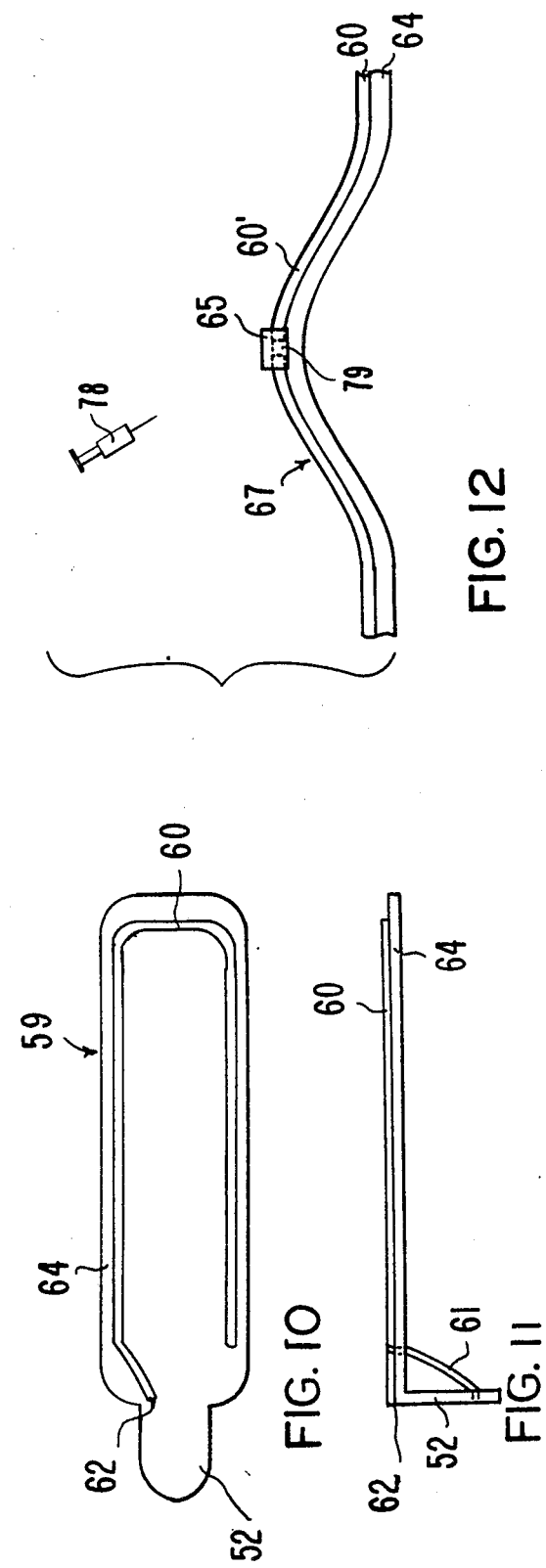

AUTOMATED SOLAR STILL

This application is a continuation-in-part of Robert L. Wyckoff, "Automated Solar Still", Ser. No. 528,399, filed Sept. 1, 1983, now abandoned which was a divisional of Robert L. Wyckoff, "Automated Solar Still", Ser. No. 287,416, filed July 27, 1982 and now abandoned.

The present invention relates to solar distillation and in particular discloses a solar still encompassing a system of piping and various types of valves so arranged as to make the still independent of supervision in its operation and easy to maintain. Capital investment is minimized by the simplicity of the design. Once installed it requires only sunshine and a source of feedwater at a pressure adequate to enter the still. The piping circuit contains only three small ordinary float valves, one manually adjustable turn off valve and a temperature sensitive valve. A special temperature sensitive valve in a deployed panel is disclosed that is made of bent pipe and some wax but more complicated temperature sensitive valves could certainly be used.

BACKGROUND ART

The origins of solar distillation are lost in antiquity. The technique has not lent itself to general application because of the cumbersome, unattractive and generally manually operated equipment. People are now aware that household water may carry chemical contamination and many are buying electric stills which are expensive to operate and require much outside energy. Others rely upon filters which are usually only partially effective. Some persons carry expensive bottled water from the grocery market while others pay for home delivery of water made expensive by the fuel and labor necessary to deliver it. The present invention discloses a method of solar distillation for the home. The unit can be made attractive, compact, easy to operate and so simple to maintain and install that most homeowners can service the still themselves. The size of the still can be readily altered to match the expected incidence of sunlight for a given area and the required supply of pure water.

DISCLOSURE OF THE INVENTION

The actual configuration of the solar still will vary with the requirements of output, amount and angle of sunlight and the need for space. The specific embodiments set out in this specification are for rooftop installation designed to supply household needs for pure water. It is understood that certain spatial relationships may be changed without altering the concept of this invention. The arrangements of the valves in sequence is a convenient order but the sequence could be altered into any number of different sequences without violating the concept herein disclosed.

A source of feedwater such as a well or a water main is connected to the entry pipe of the still. The entry pipe is first passed to the reservoir of distilled water in the bottom of the machine where a float valve permits further passage into the machine when additional water is needed. The feedwater then ascends within the entry pipe to the feedwater reservoir open at the top of the still. Here, a float valve permits the new feedwater to enter from the pipe only as it is needed to maintain the proper operating level in this feedwater reservoir. This feedwater reservoir extends over a portion of the top area of the machine, is shaded to prevent warming by the sun but open to the air to permit free evaporation for heat loss. In one embodiment, the distillation chamber is an insulated chamber with one glass face through which sunlight enters. A series of reflectors outside the evaporation chamber concentrate the light and heat of the sun into the distillation chamber. In the distillation chamber are a series of distillation trays one above the other and interconnected so that water entering the top tray would after reaching the operating level in that tray flow down into the next serially until it reached the bottom tray. In another embodiment, a series of heat absorbing panels are deployed on the sides of the machine. Feedwater flows from the reservoir through the topmost panel and then into the topmost distillation tray. The water then flows to the next panel, then to the second tray and so on. The water is heated in the panels and evaporates in the trays. In the first embodiment, a condensation plate is provided on the underside of the feedwater reservoir; in the second embodiment a condensation plate is provided along the side of the feedwater reservoir.

Two valves are incorporated into the piping of the solar still. The first valve is a temperature sensitive valve which consists of a quantity of wax which is sufficient size that when it is hardened it can occlude the entry pipe or top panel and which is situated at the top of the inverted U just below the entry level of the feed pipe or within the top panel. The wax floats on the water filling the pipe and is trapped at the top of the inverted U. When the sun is shining and it is desired that the still should take on feedwater for distillation, the water can lace its way through the melted wax, but when the still cools and cannot process any more water the wax sets and occludes the pipe backing water up in the feedwater reservoir where, as the water level rises, the intake float valve is actuated and stops further feedwater intake. The pressure in the pipe where the wax is trapped is very small. The slow flow at low pressure within the pipe permits ample time for globules of melted wax carried by the water to float back into position before they can be carried through the piping and out of the still. In applications that bring greater pressure to bear on the wax a check valve at the entry end of the pipe would prevent emptying of the pipe and loss of the wax and a constriction at any point beyond the wax would slow the float valve in the bottom tray which serves to control the feedwater flow back into the beginning of the working portion of the distillation still. Thus feedwater from the reservoir can enter the working portion of the still only when the temperature is high enough for distillation to occur and when the distillation trays need recharging. From the bottom distillation tray a pipe extends from the low point of the tray to the outside. On this pipe is a manually controlled valve which can be set to allow any amount of fixed flow from the bottom tray in the distillation chamber. This flow is set at a rate of about one-fourth the expected maximum distillation rate and serves to carry out suspended and dissolved materials which were in the feedwater. The distilled water reservoir in the base has screened vents to permit cooling.

An object of this invention is to provide a system to make solar distillation practical for the individual user by the use of an inexpensive and simple sequence of devices suitably arranged to permit reliable and automatic operation with a minimum of supervision and maintainence.

A second object of this invention is to provide a simple, inexpensive heat sensitive valve for use in solar devices and in other similar applications.

Another object of this invention is to provide a solar distillation device which may be shipped or stored as a compact unit but which may deploy a large field of solar collectors.

These and other objects of the present invention will become apparent hereinafter wherein the best mode for carrying out the invention is disclosed with reference to the appended drawings.

BRIEF DESCRIPTION OF DRAWINGS

For a more complete understanding of the solar distillation device of the present invention reference may be had to the accompanying drawings which are incorporated herein by reference and in which:

FIG. 1 is the left end view of a machine incorporating the system of controls in accordance with this invention;

FIG. 2 is the front view of the machine of FIG. 1;

FIG. 3 is the right end view of the machine of FIG. 1;

FIG. 4 is a diagrammatic view of a system in accordance with the present invention;

FIG. 5 is perspective view of the machine of FIGS. 1-3 with a single solar reflector in place:

FIG. 6 is a drawing of the temperature sensitive valve with water forcing its way through the melted wax;

FIG. 7 is a partial view of the temperature sensitive valve of FIG. 6 wherein the wax is hardened thereby closing the pipe to the passage of water;

FIG. 8 is another partial view of the temperature sensitive valve of FIG. 6 showing heat conducting vanes attached to the operative portion of the valve to increase its sensitivity to temperature change and to shorten its response time;

FIG. 9 is a front view of another solar still embodiment in accordance with the present invention with sunlight-receiving panels in deployed position;

FIG. 10 is a plan view of an individual sunlight-receiving panel from FIG. 9;

FIG. 11 is a side view of the sunlight-receiving panel;

FIG. 12 is a side view of portion of a sunlight-receiving panel which is crimped to form a variation of the temperature sensitive valve of FIGS. 6-8;

DESCRIPTION OF THE PREFERRED EMBODIMENTS

Figure 13:
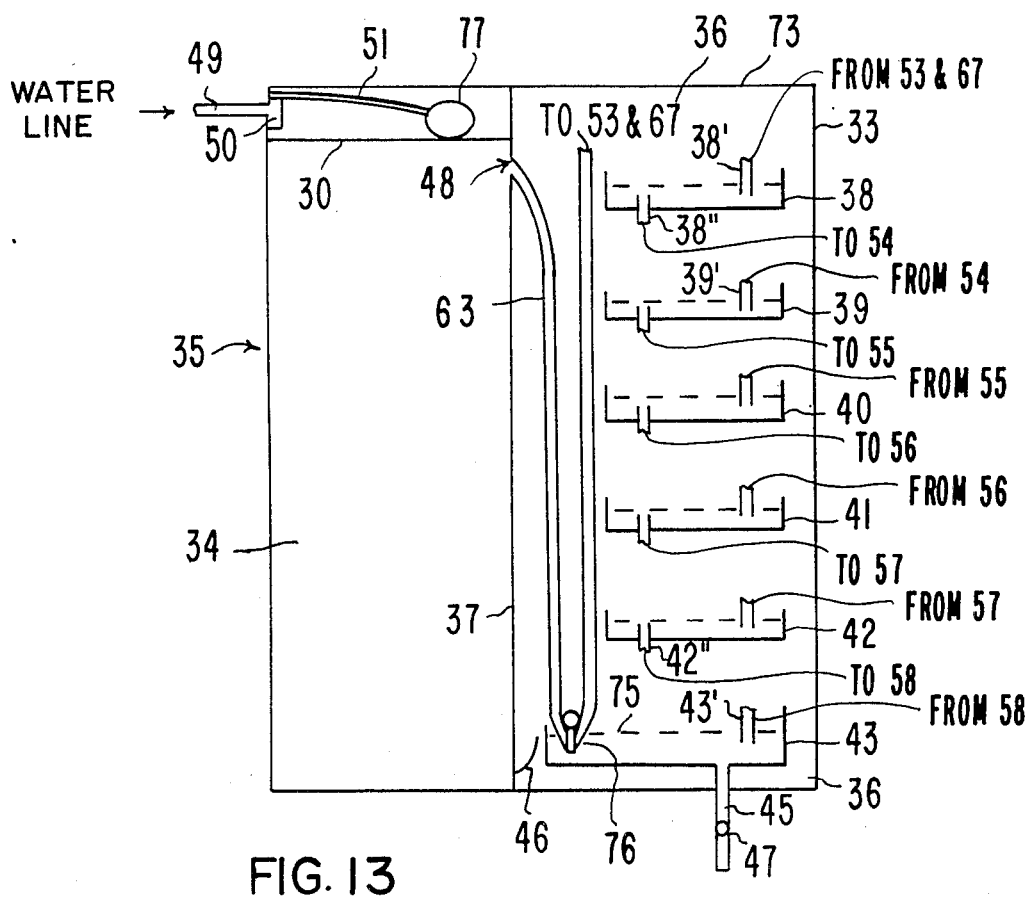
FIG. 13 is a diagrammatic view of the solar still of FIG. 9.

By reference to the Figures it can be seen that a first embodiment of the present invention is portrayed in FIGS. 1-5, a second embodiment in FIGS. 9-13, and various valves are shown in FIGS. 6-8 and 14a-b. The first embodiment is ideally encased in a single unitary cabinet but can be funtionally separated into three portions. The first is the distilled water reservoir 2 in the base which is vented to the air by screened vents 24 which permit evaporation and cooling of the stored water while protecting it from contamination by rodents, birds or insects. The screened vents can be removed for cleaning and one end of the cabinet can be removed for maintainence or major cleaning. The stored distilled water is drawn down into the house as it is needed through outlet pipe 20 drawing from above the bottom level of the tank to avoid drawing off any settled dust or sediment. The second functional portion of the machine is the top portion which is the storage tank for feedwater 6 awaiting further progress into the machine. This storage tank also is a means of breaking the pressure of the intake source and of fixing the pressure upon the remainder of the system. This feedwater reservoir 6 has a metal bottom 7 which acts as the condensation plate of the still. The condensation plate 7 is slanted so that water runs down to the end where it drips off into a drip pan 18 which delivers it to the distilled water reservoir 2 in the base through pipe 19. The feedwater storage tank 6 is open to the air to permit evaporation and cooling but shaded by a cover 23 to reduce warming by the sun. The third and largest portion of the machine is the evaporation chamber which in the present form as pictured is above the distilled water reservoir and below the feedwater reservoir-condenser 6, 7. The evaporation chamber is an insulated chamber with a glass face 21 tilted so as to capture as much as possible of the light and heat of the sun. The glass face 21 is ringed by a series of reflectors 22. For simplicity of illustration the reflectors 22 are omitted from all drawings except for the single reflector shown in FIG. 5. Connecting these disparate parts for functional purposes are pipes and valves which will now be described in detail with reference to the drawings.

For a household application in accordance with the first embodiment of the present invention, shown in FIGS. 1-4, feedwater from a water main or well, lacking in purity, is directed into the intake pipe 1 which leads to a float valve 3 which is controlled by the level of distilled water in the distilled water reservoir 2. If more distilled water is needed to replenish the distilled water reservoir 2 the feedwater proceeds under pressure from its source to a second float valve 4 controlled by the level of feedwater in the feedwater reservoir 6. When the feedwater reservoir needs replenishment to maintain its level the float valve 4 permits feedwater to enter from the end 5 of the pipe 1. The pressure of the feedwater source is now broken and pressure in the remaining pipes of the input system is limited by the height of the feedwater reservoir 6 over the level of the level of the outlet 29 of the input pipe 8. To prevent a buildup of salts and sediments in the solar still a certain amount of the water must pass through to carry out solid and disolved matter. For this purpose a pipe 16 extends downwardly from the low point of the bottom evaporator pan 12 and carries wastewater out of the machine at a rate controlled by adjustable valve 17. The valve on the outflow is set so that about one fourth of inflow at optimal operating conditions passes out of the still as wastewater. The evaporating pans within the evaporating chamber are interconnected so that the input water which feeds into the top pan 10 fills it first and then progresses through pipe 14 to the next pan 11; then when pan 11 fills to its operating level input water empties into the bottom pan 12 via interconnecting pipe 15. The pipe 8 which carries the feedwater from its reservoir 6 to the top pan 10 where the evaporative process first occurs, follows a long convoluted course containing two valves. The pipe 8 drops vertically from the feedwater reservoir 6 and after a considerable course makes a U turn proceeding upward again toward the top of the evaporative chamber, but just before reaching that level it again makes a U turn once more directing it downward. Filling the lumen of the pipe at inverted U section 9 is a quantity of wax with a melting point which has been determined to the minimum effective operating temperature of the solar still as measured in the evaporating chamber for a particular location or application. When the temperature is too low for satisfactory operation the wax hardens and the feedwater is unable to pass into the evaporating pans causing it to back up until the float-valve 4 on the feedwater reservoir closes. When the evaporative chamber reaches operating temperature the wax melts permitting water to lace its way through the valve 9, as shown in FIG. 6 where the water is indicated as 9b and the wax as 9a. To make the valve more sensitive to temperature change, fins or vanes 27 fabricated of heat conducting material may be placed around the pipe 8 at the location of inverted U section 9. When utilized with a low pressure flow, as described, the wax that may be carried down the pipe 8 a short distance rises back up against the current of the water due to the difference in specific gravity. If there is danger that the flow may be more rapid and wash out the wax or if there is a danger that the water in the pipe may dry out permitting the wax to flow out, a check-valve 28 may be installed at the beginning of the pipe to prevent drying or emptying and constrictions such as a fine mesh screen may be placed anywhere along the pipe past the valve 9 and before the outlet end 29. The temperature sensitive valve just described has most immediate application to solar installations of all types but the principle of this valve of working upon melting point and specific gravity differences to two immiscible fluids (one of which is more easily transformed into the solid state) has broad general application. The U may be upright when mercury is the temperature sensitive agent or if lead is used. In instances where the temperature sensitive agent is more dense than water the flow will also depend upon the pressure head so the valve also functions as a pressure sensitive valve. The possible combinations are myriad. Once past the temperature sensitive valve the feedwater flows down to the level of a float valve 13 which floats in and is controlled by the level of the water in the bottom evaporation pan 12. The level of water in the bottom pan is subject both to evaporation and to the controlled outflow through wastewater pipe 16; therefore, pan 12 first reflects the need for more feedwater into the evaporative pans. When the level of water in evaporative pan 12 drops it permits the feedwater to pass on up the pipe 8 to the top pan 10 where the water enters through the end 29 of the pipe 26 after passing through any constriction (not shown) that might be used to reduce the flow rate to prevent outflow of the wax 9a in the wax valve 9. In addition, to prevent the passage of wax beyond wax valve 9 the pipe 26 may be distorted or constricted.

An alternate embodiment of the solar distillation still of the present invention is shown in FIGS. 9-13. In this embodiment the unit is stored or transported in a nonfunctional condition, and is rendered functional by deployment of heat absorbing panels, as shown in FIG. 9. Then same general distillation principle applies to the alternate embodiment as pertains to the first as seen by reference to the diagrammatic view of the distillation process given in FIG. 13. In both embodiments the fluid flow into the distillation system is regulated by the water level in the last evaporation tray. The flow is further regulated by a temperature sensitive valve (9 in FIG. 4; 67 in FIGS. 13 and 12) which admits water into the system only when the temperature of the fluid is high enough to experience appreciable evaporation. The distinction is that in the first embodiment the water is heated directly in the evaporation trays by solar insulation whereas in the second embodiment the water is heated in panels deployed outside the evaporation chamber. In the second embodiment, after being heated the water is passed through evaporation trays where evaporation occurs. The fluid flow sequence for the second embodiment may be understood by considering, together FIGS. 9 and 13.

In FIG. 9 a solar still in accordance with the alternate embodiment of the present invention is shown in the deployed position. An evaporation tray compartment 36 has a front cover 33 which may be opaque to sunlight. This is permissible since the surface area of cover 33 is relatively small compared to the total effective surface area of panels 53, 54 . . . 58. A transparent front cover or top cover may be provided for evaporation tray compartment 36 if the incremental solar insulation is worth the cost of the glass or clear plastic components; such costly components are not required in accordance with this invention. Incoming energy is collected primarily in the deployed panels 53, 54 . . . 58 as the water flows through heat conducting water tubes which are mounted in thermal contact with the panels or are formed integrally with them.

An illustrative panel 59 is shown in plan view in FIG. 10. A relatively thin sheet 64 of heat conducting material such as aluminum, copper or treated plastic, is formed with a tab 52. Preferably, sheet 64 will have a blackened front surface and an insulated back surface (not shown). When panel 59 is deployed, the tab 52 is bent at right angles to the body of the panel. The bent tab, shown in FIG. 11, is inserted into a bracket (not shown) formed in a side 31 or 32 of evaporator compartment 36; alternately, tab 52 rides in a slot formed in side 31 or 32. Water enters tube 60 through inlet end 62 at the level of the panel from an associated evaporator tray, as discussed with reference to FIG. 13, flows through tube 60 around the periphery of panel 59 and is discharged through tube extension 61 and into a side 31 or 32 of evaporator tray compartment 36 and thence into the evaporator tray next in sequence. Preferably, tube 60 is formed of a heat conducting metal such as aluminum or copper to readily receive heat from the heat conducting sheet 64 which comprises panel 59 and tube extension 61 is preferrably formed of a pliable rubber or plastic to readily be attached and detached from the sides 31 or 32 of evaporation tray compartment 36 as the solar still is alternately deployed or removed from service. To obtain the maximum size solar collection field for a given size evaporation chamber the tab of the topmost panel may be bent downwardly thereby allowing the upper half of the top panel to extend above the top of the cover of the evaporation chamber; in reverse fashion, the tab of the bottom panel may be bent upwardly thereby allowing the bottom half of the lower panel to extend below the bottom of the evaporation chamber. The angle of presentment of the panels to solar insulation is controlled by the location of the aforementioned slots or brackets in the sides 31 or 32 of evaporation tray compartment 36. In order to permit deployment at locations of differing latitude and longitude and to permit seasonal adjustment a multiplicity or brackets or slots will be supplied on the sides 31 and 32. Thus the person operating the still may select the bracket or slot which provides the optimum angle for receiving the greatest total amount of energy at a given time and place. In FIG. 9, the panels 53, 54 ... 58 are of the same dimension as illustrative panel 59 shown in plan view in FIG. 10 and are deployed at an angle of 42° from the vertical with the surfaces 64 being oriented upwardly to receive sunlight throughout the day. The optimum packing for the paddles on the sides 31 and 32 is obtained by placing the paddles at progressively increasing depths from the front cover 33. In addition, the tabs may be bent and the panels deployed with respect to the evaporation chamber, as described previously.

The distillation process is seen in the diagrammatic view of FIG. 13. Here, feedwater from the water line 49 enters through float valve 50, such standard toilet float valves which are available from the American Standard Company. When the surface 30 of stored feedwater 34 reaches a sufficiently low level float 77 will have dropped and drawn arm 51 downwardly, thereby opening valve 50 to admit water from water line 49. Valve 50 closes as float 77 rises to a preset level. Thus, the opening 48 to inlet pipe 63 is continuously provided with feedwater at nominal pressure. In alternate embodiments, feedwater storage tank 35 is supplied with seawater, polluted well water, or other contaminated liquids from which it is desired to produce potable water. In accordance with the present invention the flow of water through the evaporation chamber and panels is by the force of gravity and is not otherwise pressurized.

A supply of water to be distilled is thus continuously available in inlet pipe 63 at a pressure determined only by the height of water level 30. The water passes through valve 76 which is controlled by the water level in the bottom evaporation tray 43. Additional water is admitted through valve 76 only when the water level in tray 43 subsides below a preset reference level. Valve 76 only prevents the trays in evaporation compartment 36 from becoming overfilled or from being underutilized; it is not an on-off valve dependent upon external conditions. Water would continue to flow through valve 76 even if no evaporation were occuring since there is normally a continuous discharge through outlet pipe 45 and valve 47 which cleans out the still. A preferred version of valve 76 is shown and discussed with reference to FIGS. 14a and 14b.

As water to be distilled passes through valve 76 it rises up to a level adjacent to the inlet end 62 of the topmost panel 53, providing level 30 in the feedwater tank 35 is maintained above the height of panel 53. It connects through the side 31 to the associated inlet end 62 so that water flows through the tube 60 in panel 53. Then, after being heated an incremental amount, the flowing water is discharged through the associated tube extension 61 and into inlet tube 38' which delivers the water into topmost evaporation tray 38. In tray 38 evaporation occurs continuously. Also, there is a continuous discharge of water through outlet 38'' from tray 38 into the inlet end 62 of panel 54. The flowing water is then incrementally heated and returned via inlet tube 39' into evaporation tray 39 where additional evaporation occurs. This flow sequence is repeated for each of the trays in succession so that the water flows from tray 39 to panel 55, from panel 55 to tray 40, from tray 40 to panel 56 and so on until the water flows from panel 58 into bottom evaporation tray 43. In each tray evaporation occurs from the surface, even though the water is continuously progressing downwardly from tray to tray. The cumulative evaporation from tray 38 to tray 39 and so on to bottom tray 43 is the source of potable water. The evaporated water condenses on the side 37 of feedwater storage tank 35 and drips into collection trough 46 from whence the distillate is drained and is available as potable liquid. As with the first embodiment the collection of sediment is avoided by maintaining a continuous, flushing flow of water through bottom evaporation tray 43 by means of outlet pipe 45 and conventional valve 47.

The penultimate regulation of flow in the automated solar still of FIGS. 9–13, as with the embodiment of FIGS. 1–5, is provided by a temperature sensitive valve. A separate valve such as valve 9, as described previously, may be incorporated in the internal piping network. In a preferred embodiment, the temperature sensitive valve is incorporated in one of the panels. The panels are directly exposed to the incoming sunlight so they provide the best place to gauge the the temperature to which the water is being heated. Preferably, this temperature sensitive valve is included in the topmost panels because it is less likely to be shaded by the distillation chamber in the early morning or in the late afternoon. In one embodiment the valve consists of a crimp along one edge of a panel which necessarily elevates one portion 60' of tube 60 above the remainder of the tube, as shown in FIG. 12. Within this elevated portion 60' a quantity of wax is contained which is sufficient when hardened to occlude the tube 60. As discussed previously, when the sun is shining the water can lace its way through the melted wax. Preferably, a flexible tube connector 65 connects the separated ends of sections of tube 60 so that melted wax may be injected by a hypodermic type syringe 78 if replenishment is required. In one embodiment the arcing portions 60' of tube 60 are fabricated from a transparent medium so that the functioning of the valve may be monitored; in this embodiment a colored wax 79 may be used to allow the ready visual observation of the occlusion of the tube 60.

Figure 14A:
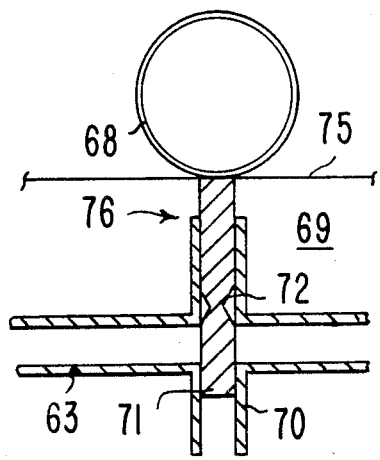
FIGS. 14a and 14b are side cross sectional views, of a float valve which show, respectively, the closed and open positions.
Figure 14B:
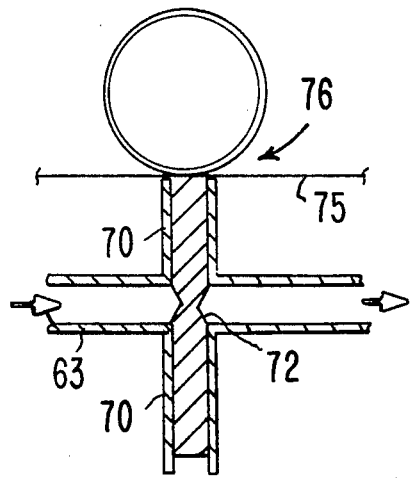

A possible float valve for use as valve 13 in FIG. 4 or as valve 76 in FIG. 13 is shown in FIGS. 14a and 14b. The float valve 76 could be mounted by a simple bracket (not shown) to the inside of the bottom trays 12 or 43. Float valve 76 comprises a valve casing 70 within which a valve stem 71 rides with vertical freedom. A bouyant float 68 is affixed to the upper end of valve stem 71. Bouyant float 68 rides on the surface 75 of the water 69 contained in the bottom evaporation tray 43. When the level 75 has reached its full height the valve stem 71 is raised to the point where the flow through input pipe 63 is completely blocked, as shown particularly in FIG. 14a. As the level of water in tray 43 subsides, float 68 drops and valve stem 71 is lowered within casing 70, thereby exposing narrowed neck section 72 of valve stem 71 to the water in inlet pipe 63. Consequently, water flows around valve stem 71 and into the tube 60 in panel 53 and eventually tray 43 refills as the water wends its way from tray to panel, panel to tray and thence to the bottom tray. When tray 43 refills the water level 75 rises and the flow of water through valve 50 is cut off as valve stem 71 rises to the position of FIG. 14a.

A comparison of the direct heating embodiment of FIGS. 1–5 with the external heating embodiment of FIGS. 9–13 shows that the external heating embodiment has a smaller evaporating chamber for a given solar collection field. Thus, when stored or transported much less volume is required. In addition, no expensive and fragile glass or plastic materials are required; metal or wood components may be used exclusively. In general, the limiting criterion is that there be sufficient cumulative area in the evaporating trays to meet the estimated water requirements. Since the evaporating trays of the external heating embodiment do not need to share the solid angle of solar insulation they can be densely stacked as seen in FIG. 13 and a significant evaporation area can be housed in a small volume. In addition, the external heating embodiment is preferred because of ease of packing and shipping as the panels can be stacked, less material is required and mass production is more readily accomplished.

I claim:

1. An automated solar still having a temperature sensitive valve incorporated within a deployed solar absorber panel, comprising:

a feedwater storage tank having an opening for supplying feedwater at nominal pressure;

an evaporation chamber containing a series of evaporation trays for receiving and evaporating said feedwater and a condensor plate for condensing water vapor, said series of evaporation trays being affixed within said evaporation chamber in spaced apart relationship at descending heights, the upper tray of said series of trays being connected by a pipe to said opening of said feedwater storage tank, said upper tray of said series of trays being positioned below said opening of said feedwater storage tank so that feedwater may flow by gravity through said pipe from said feedwater tank into said upper tray;

a series of solar absorber panels detachably attached to the exterior of said evaporation chamber, each of said solar absorber panels having a fluid-tight conduit for passage of said feedwater, each of said solar absorber panels being associated in one-to-one relationship with a particular tray in said series of trays;

a piping network for feeding feedwater from a particular tray to the associated solar absorber panel and for feeding feedwater from said associated solar absorber panel to the next lowest tray from said particular tray, said piping network including a series of inlet pipes connected between particular trays in said series of trays and the inlet of said fluid-tight conduit in said associated solar absorber panel, and further including a series of outlet pipes connected between the outlet of said fluid-tight conduit in said associated solar absorber panel and said next lowest tray; and a temperature sensitive valve incorporated within said fluid-tight conduit in one of said panels in said series of solar absorber panels, said valve thereby being in thermal communication with said feedwater flowing through said fluid-tight conduit in said one of said panels, whereby said valve is open when the temperature of said feedwater is at or above the threshold temperature for evaporation within said series of trays in said evaporation chamber and wherein said valve is closed when the temperature of said feedwater is below the threshold temperature for evaporation within said series of trays in said evaporation chamber.

2. An automated solar still in accordance with claim 1 wherein said temperature sensitive valve is incorporated in said panel associated with said upper tray.

3. An automated solar still in accordance with claim 1 wherein said temperature sensitive valve comprises a crimped section of said one of said solar absorber panels wherein said fluid-tight conduit is crimped into an inverted U-shaped, said inverted U-shaped portion of said conduit containing a material immiscible in water, the melting point of said immiscible material being near the minimum effective operational temperature of said solar still.

4. An automated solar still in accordance with claim 3 wherein said inverted U-shaped portion of said conduit is transparent and wherein said immiscible material has a color to be readily visible through said transparent inverted U-shaped portion of said conduit.

5. An automated solar still in accordance with claim 3 wherein said inverted U-shaped portion is separted in spaced apart relationship near its center and wherein the ends of said separated portions are connected by a flexible member to permit the resplenishment of said immiscible material by hypodermic apparatus.

* * * * *